Jan. 9, 1951   J. E. YEAKEL   2,537,296
WEATHER STRIP FOR DOORS
Filed Oct. 25, 1948

INVENTOR.
Jacob Elwood Yeakel
BY
Martin E Anderson
ATTORNEY

Patented Jan. 9, 1951

2,537,296

UNITED STATES PATENT OFFICE 2,537,296

WEATHER STRIP FOR DOORS

Jacob Elwood Yeakel, Denver, Colo.

Application October 25, 1948, Serial No. 56,415

3 Claims. (Cl. 20—68)

This invention relates to weather strips and more particularly to improvements in weather strips for attachment to the bottoms of doors.

One of the objects of the invention is to provide a weather strip which automatically conforms to the irregularities of a floor in all positions of adjustment of the door.

Another object is to effect automatic lifting of the weather strip to pass over a floor covering such as a rug, linoleum, or the like.

Another object is to effect an optimum predetermined sealing pressure on a seal strip, which remains constant in all positions of the weather strip.

A further object is to provide a weather strip which is simple in construction, rugged, and can be easily and economically manufactured.

Still further objects will become more apparent from a consideration of the description to follow, the appended claims and the accompanying drawing, in which:

Figure 1:
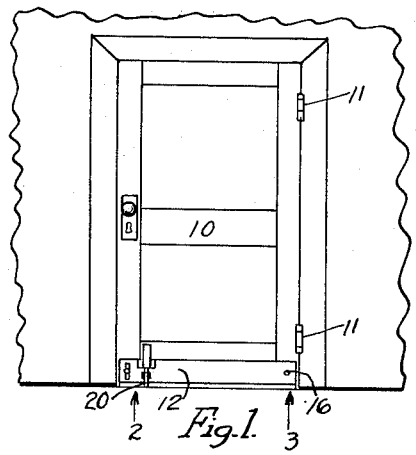
Figure 1 is a side elevation of a conventional door showing the weather strip attached to the bottom thereof.
Figure 7:
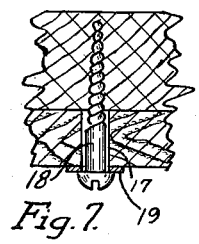
Figure 7 is a section taken on line 7—7, Figure 2.
Figure 6:
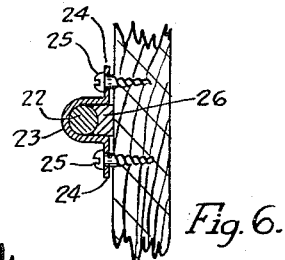
Figure 6 is a section taken on line 6—6, Figure 2.
Figure 5:
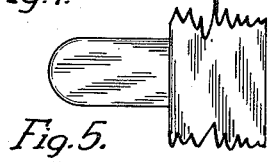
Figure 5 is a top plan taken on line 5—5, Figure 4.
Figure 2:
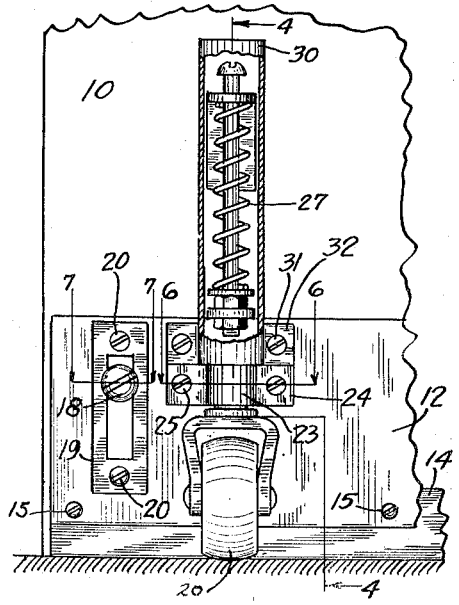
Figure 2 is an enlarged elevation of the left, or outer end of the weather strip taken in the direction of the arrow 2, Figure 1, a portion being broken away.

Referring in detail to the drawing, there is shown in Figure 1 a conventional door 10, mounted on hinges 11 which permit the door to swing inwardly of the room, to the bottom of which is mounted the weather strip 12.

The weather strip is formed of a rectangular piece of material, here shown as wood, which has a groove 13 in its lower edge in which is secured a rubber squeegee or seal strip 14 by means of wood screws 15, which pass through the seal strip.

One end of the weather strip is secured to the inner face of the door by a wood screw 16, which passes through the weather strip into the door, this screw being tightened sufficiently so that the weather strip is in contact with the door, but free to pivot on the screw. The other end of the weather strip has a transverse slot 17 through which a screw 18 passes into the door, the head of the screw being in slidable engagement with a slotted metal plate 19 suitably secured to the weather strip as with wood screws 20. Screw 18 is also suitably adjusted so that the weather strip is in engagement with the door, but free to move up and down.

A roller 20 is secured to the weather strip adjacent the slot 17, by a bracket 21 having a stem 22 integral therewith, this stem being held to the weather strip by a U-shaped clamp 23 having ears 24 through which pass wood screws 25. A suitable spacer 26 is also provided against which one side of the stem abuts. The foregoing construction renders the roller adjustable vertically for a purpose to hereinafter appear.

The weather strip is spring urged downwardly by a spring 27, the upper end of which abuts an L-shaped bracket 28 screwed to the door, and the lower end a bracket 29 screwed to the weather strip. A suitable housing 30 encloses the spring structure, this housing being secured to the weather strip by screws 31 which pass through ears 32 on the lower end of the housing. This lower end overlaps bracket 23 and screws 31, if desired, may pass through holes in bracket 23.

Figures 3, 4:
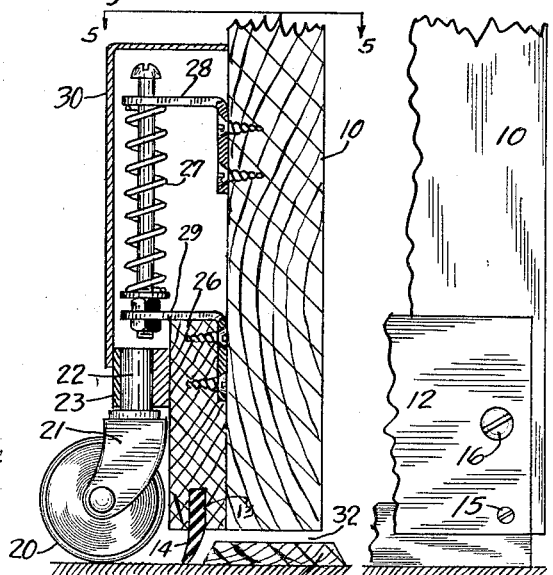
Figure 3 is an enlarged elevation of the right, or inner end of the weather strip taken in the direction of arrow 3, Figure 1.
Figure 4 is a section taken on line 4—4, Figure 2.

When it is desired to install the weather strip on a door, screw 16 is so placed that the seal strip 14 is slightly bent to one side, as shown in Figure 4. Screw 18 is then applied to the door, the position in the slot 17 being chosen so that the seal strip may move up and down to conform to the floor in all positions of swinging movement of the door. Bracket 28 is then secured to the door in such position that the spring 27 urges the left or outer end of the seal strip against the floor in bent position as shown in Figure 4. The roller 20 is then adjusted (or may be previously adjusted) so that it limits the amount of deformation or bending of the seal strip.

Figure 8:
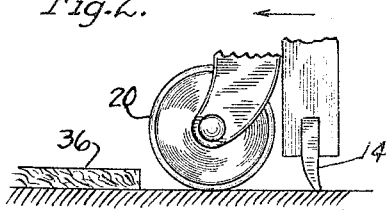
Figure 8 is an elevation of a fragment of the device showing the weather strip about to be lifted over an obstruction.
Figure 9:
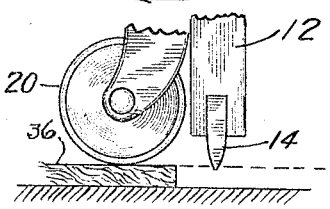
Figure 9 is a similar view showing the weather strip in lifted position.

Figure 4 shows the manner in which the parts appear with the door closed, seal strip 14 being bent toward the inside of the room and sealing the opening 32 between the bottom of the door and threshhold 33. Figure 8 shows the position of the seal strip when opening of the door occurs, as shown by the arrow, the seal strip now having flopped over center, in the same manner as a windshield wiper blade on an automobile. Roller 20 is also shown in a position about to ride over the edge of a rug, linoleum, or other floor covering 36. Figure 9 shows the roller on top of the floor covering with the seal strip lifted away from the floor so that it may move onto the floor covering without dragging or catching the edge thereof. The importance of the roller will now become fully apparent; it not only limits the amount of deformation of the seal strip in all positions of the door, but also acts to raise the strip onto a floor covering, which in its absence would catch the floor covering and curl it and prevent the door from opening.

While the roller device has been shown on one end of the weather strip only, the other end being pivoted, it is apparent that rollers may be provided at both ends, if desired, that is, in lieu of pivot screw 16, the slotted arrangement 17 and roller structure could be provided in its stead. With doors which open about a pivot, such as hinges, this would not be required, but where the door has substantial movement on both ends, that is where the door is bodily movable, it would be found expedient to employ the roller structure at both ends of the weather strip. Other modifications will become apparent to those skilled in the art in the light of the disclosure, hence the invention is not to be limited to the exact disclosure except as defined by the scope of the appended claims.

Having described the invention what is claimed as new is:

1. A weather strip for the bottoms of doors, comprising, an elongated member, a seal strip projecting beyond the bottom of the member for engagement with a floor, means adjacent one end of the member for mounting it to the side of a door for vertical movement relative thereto, resilient means for urging the other end of the member toward the floor, and roller means movable along the floor in contact therewith for resisting the urge of the resilient means, said roller means being disposed to one side of the elongated member and adapted to ride over an edge of a floor covering, such as a carpet or the like, and raise the seal strip above the floor before the seal strip contacts the edge of the floor covering, whereby the seal strip passes over the floor covering without interference therefrom.

2. A weather strip in accordance with claim 1 wherein the last named means may be vertically adjusted on the elongated member to position the floor contacting portion thereof relative to the lower edge of the seal strip, whereby the amount of lateral flexure in the seal strip may be regulated.

3. A weather strip for the bottoms of doors, comprising, an elongated member, a resilient seal strip mounted in a groove in the bottom of the member and extending therebeyond for engagement with a floor, an aperture adjacent one end of the member, screw means adapted to extend through the aperture and into the door to provide a pivotal mounting for the member for vertical movement thereof, a vertically extending slot in the member adjacent the other end thereof, screw means adapted to extend through the slot for securing the other end to the door and permitting the vertical movement aforesaid, a roller support including a shank, a clamp adjustably securing the shank to the member adjacent the slot, a roller mounted on the support adapted to roll along the floor, a bracket adapted to be secured to the door, a spring interposed between the bracket and member for urging the member downwardly, and a housing enclosing the spring and bracket.

JACOB ELWOOD YEAKEL.

REFERENCES CITED

The following references are of record in the file of this patent:

UNITED STATES PATENTS

| Number | Name | Date |
|--------|------|------|
| 558,786 | Doyle | Apr. 21, 1896 |

FOREIGN PATENTS

| Number | Country | Date |
|--------|---------|------|
| 25,913 | Great Britain | Oct. 9, 1909 |
| 3,477 | Great Britain | Feb. 11, 1913 |